US006120637A

United States Patent [19]

Barry

[11] Patent Number: 6,120,637

[45] Date of Patent: Sep. 19, 2000

[54] SELF-ADHESIVE LABELS AND MANUFACTURE THEREOF

[75] Inventor: David Robert Barry, St. Louis, Mo.

[73] Assignee: Inprint Systems, Inc., St. Charles, Mo.

[21] Appl. No.: 09/184,951

[22] Filed: Nov. 3, 1998

Related U.S. Application Data

[62] Division of application No. 08/694,290, Aug. 8, 1996, Pat. No. 5,863,628.

[51] Int. Cl.[7] .............................. B32B 31/10; B32B 31/18

[52] U.S. Cl. .......................... 156/252; 156/253; 156/267; 156/268; 156/269; 156/301

[58] Field of Search .................................... 156/267, 268, 156/269, 270, 289, 300, 301, 302, 252, 248, 253; 428/40.1, 41.7, 41.8, 42.1, 42.2, 78, 194; 281/2, 5; 283/81

[56] References Cited

U.S. PATENT DOCUMENTS

| | | | |
|---|---|---|---|
| 4,529,229 | 7/1985 | Glibbery . | |
| 4,690,720 | 9/1987 | Mack | 156/270 X |
| 4,930,812 | 6/1990 | Howard . | |
| 4,933,043 | 6/1990 | Instance | 156/267 X |
| 4,991,878 | 2/1991 | Cowan et al. | 283/81 |
| 5,200,243 | 4/1993 | Van Veen . | |
| 5,234,735 | 8/1993 | Baker et al. . | |
| 5,262,214 | 11/1993 | Instance | 156/269 X |
| 5,290,616 | 3/1994 | Cowan et al. | 283/81 X |
| 5,308,119 | 5/1994 | Roshkoff | 283/81 X |
| 5,399,403 | 3/1995 | Instance . | |
| 5,403,636 | 4/1995 | Crum | 283/81 X |
| 5,489,123 | 2/1996 | Roshkoff | 283/81 |
| 5,587,222 | 12/1996 | Hoffmann | 428/42.1 X |
| 5,639,125 | 6/1997 | Garrison . | |
| 5,639,332 | 6/1997 | Instance | 156/267 X |
| 5,674,334 | 10/1997 | Instance | 156/268 X |
| 5,700,537 | 12/1997 | Instance | 428/41.9 |
| 5,727,819 | 3/1998 | Grosskopf et al. | 283/81 |
| 5,766,716 | 6/1998 | Barry | 428/40.1 |
| 5,804,271 | 9/1998 | Barry | 428/40.1 |
| 5,829,789 | 11/1998 | Treleaven et al. | 283/81 |
| 5,830,550 | 11/1998 | Treleaven et al. | 428/40.1 |
| 5,846,623 | 12/1998 | Denny | 428/42.3 |
| 5,860,238 | 1/1999 | Anderson . | |
| 5,863,628 | 1/1999 | Barry | 428/40.1 |
| 5,975,575 | 11/1999 | Instance | 156/270 X |

FOREIGN PATENT DOCUMENTS

| | | |
|---|---|---|
| 0633555 | 1/1995 | European Pat. Off. . |
| 0650154 | 4/1995 | European Pat. Off. . |
| 4136619 | 5/1993 | Germany . |
| 8604551 | 8/1986 | WIPO . |

*Primary Examiner*—Curtis Mayes
*Attorney, Agent, or Firm*—Rothwell, Figg, Ernst & Manbeck

[57] ABSTRACT

A self-adhesive label carried on a backing of release material, the label comprising a multilaminar label, a self-adhesive overlaminate covering the multilaminar label and a self-adhesive overlabel adhered to an upper surface of the overlaminate. The invention also provides a method of producing a succession of self-adhesive labels carried on a backing of release material, the method comprising the steps of providing an elongate web including a backing of release material, applying a succession of multilaminar labels to the elongate web, laminating over the succession of multilaminar labels a self-adhesive plastics overlaminate web, applying a succession of self-adhesive overlabels over the overlaminate and die-cutting through the overlabels, the overlaminate and the multilaminar labels to form the self-adhesive labels in each of which at least one overlabel is adhered to a portion of the overlaminate web which covers a multilaminar label.

7 Claims, 4 Drawing Sheets

SELF-ADHESIVE LABELS AND MANUFACTURE THEREOF

"This application is a Divisional of application Ser. No. 08/694,290 filed Aug. 8, 1996, now U.S. Pat. No. 5,863, 628."

BACKGROUND TO THE INVENTION

The present invention relates to self-adhesive labels and to a method of producing self-adhesive labels. In particular, the present invention relates to self-adhesive labels of multilaminar construction in which the label incorporates a booklet or folded sheet so as to provide a large surface area for carrying printed information which is greater than the surface area of the footprint of the label. The labels of the present invention have particular application in the labelling of pharmaceutical products.

A variety of so-called leaflet labels or booklet labels are known in the art and a typical label construction is disclosed in U.S. Pat. No. 5,399,403 in the name of David J Instance. It is well known for the folded leaflet or booklet to be overlaminated with a self-adhesive transparent plastics layer. The overlaminate provides durability to the label against inadvertent damage or tearing and also improves the aesthetic appearance of the label. Furthermore, the overlaminate can provide a structural part of the label to enable the leaflet or booklet label to be opened from a closed configuration by pulling the overlaminate away from a surface of a product, such as a pharmaceutical container, which is labelled to enable the leaflet or booklet to be read by a user. In some labels, the overlaminate can be re-adhered to the product to return the label to its closed configuration. Typical plastics materials for use as the overlaminate include oriented polypropylene carrying a pressure-sensitive adhesive on its rear surface.

U.S. Pat. No. 4,529,229 discloses a self-adhesive label in which an adhesive strip is provided to retain a folded strip in its folded configuration by being adhered to a top panel and an underlying panel of the strip.

When pharmaceutical products are labelled, it is often necessary for the label to be printed with specific information, such as a lot or batch code and an expiry date. Such printing is generally achieved by providing a generic printed label for a particular pharmaceutical product and then overprinting a series of the labels with the required batch or lot code and expiry date.

A technical problem exists in the art in that there is a need to provide on overlaminated leaflet or booklet labels an overprint area and in particular an overprint area which is suitable for being printed with high quality alphanumeric printing devices suitable for printing batch codes, expiry dates and the like. There is also a need in the art for such overlaminated labels, particularly for pharmaceutical products, to be overprinted with bar codes which contain information relating to the overprinted batch codes, expiry dates, etc. and act as a security feature which can be scanned automatically to check that the required overprinting has been effected. The bar code needs to be small in area yet accurately printed in order to be machine readable at high speeds When information is overprinted onto paper, i.e. when a non-overlaminated leaflet or booklet label is being printed, ink is printed onto the paper surface of the label and then a laser is employed either to vaporise some of the ink so as to leave white lettering surrounded by the ink or to bum the lettering into the surface of the paper. The present inventor has attempted to replicate this laser printing process onto a plastics overlaminate, in particular an oriented polypropylene self-adhesive laminate. However, following laser treatment the appearance of the printing is poor because the laminate tends to have a bubble effect imparted thereto by the laser, which the present inventor believes results from vapours being emitted from the paper surface and thermal distortion of the plastics laminate. In addition, it is believed that the overlaminate absorbs some of the energy from the laser which may require the utilisation of a relatively powerful laser, or a longer burn time, which may in turn exacerbate the bubbling problem.

The present inventor has also attempted to overprint onto a plastics overlaminate by using a thermal transfer printer. Such thermal transfer printers use a multi-element print head with a large number of tiny heating elements that can be turned on and off in a desired pattern or configuration under computer control so as to print selected alphanumeric characters. A ribbon is pressed between the print head and the substrate to be printed and when the print head elements are turned on so as to become heated, the elements soften the coating on the surface of the ribbon in contact with the substrate allowing the coating to stick to the substrate as a pattern of dots. The desired alphanumeric symbols to be printed are of course controlled by selectively activating the desired pattern of heating elements. The present inventor has discovered that the plastics overlaminate surface tends not to be receptive to some thermal transfer coatings.

There is also a desire to overprint a plastics overlaminate by means of wet printing. In wet printing a liquid vehicle of a wet printing ink dries by absorption into the printed substrate. This is not possible with a plastics overlaminate because the vehicle cannot absorb thereinto, leading to smudging of the printed image.

The present invention aims at least partially to solve these problems of the prior art.

It is known to provide a two-component leaflet or booklet label in which a leaflet or booklet is overlaminated with a self-adhesive transparent plastics layer which is adhered on opposed sides of the leaflet or booklet to a backing of release material (or release liner), such as silicone-coated paper. A typical label having such a construction is disclosed in FIG. 4 of U.S. Pat. No. 5,399,403. The opposed laminate portions on opposed sides of the booklet or leaflet constitute leading or trailing edges of the label in the direction of the length of the liner web of release backing material. The self-adhesive leaflet or booklet labels are automatically applied to products to be labelled by providing a reel of the labels carried in succession on the web of release backing material and the reel is unwound and the backing of release material is pulled back over a peel plate of the label applicator whereby the leading edge of the forwardly moving label is fed off from the release backing material onto the product. When the leading element of the label to be dispensed consists of a laminate flap, i.e. simply the overlaminate which is initially adhered to the backing of release material, the flexibility of the laminate and its inherent lack of stiffness tends to make it difficult to ensure that the leading edge of the label defined by the laminate breaks away from the liner of release backing material at the peel plate Accordingly, it is known in the art, in order to provide sufficient stiffness to the laminate to enable the leaflet or booklet label to be dispensed acceptably by the label applicator, for a relatively thick laminate to be employed, for example a laminate 0.002 inches (0.0508 mm) thick, which is greater than the thickness required both for protection of the label and to ensure that following die-cutting of the labels the laminate is sufficient strong to constitute a matrix web which pulls waste cut away portions of the labels away from the release material.

It is a further object of the present invention at least partially to solve this problem of the prior art, and in particular to provide sufficient stiffness to the leading edge of a label to enable it to be dispensed by a label applicator without requiring an excessively thick self-adhesive transparent plastics laminate.

It is yet a further object of the present invention to provide an overlaminated label having sufficient thickness whereby no modifications to a standard label applicator are required.

Known leaflet and booklet labels can suffer from the disadvantage that when several versions of the same label construction corresponding to slight variations in the product to be labelled are required, it is necessary to have an entirely-separate printed leaflet or booklet for each version of the label. For example, a pharmaceutical product may require two versions of substantially the same label, one version for each particular strength of the same pharmaceutical product and for agrochemicals, two versions of the same label may be required for different bottle sizes, e.g. 1 liter and 5 liters. The requirement to manufacture a number of substantially the same labels having slight variations relating to the differences in the products can be relatively inefficient to manufacture, particularly for short manufacturing runs for the labels, because this requires the folded leaflet or booklet parts to be manufactured to order or held in stock for each label version.

It is a further object of the present invention to provide lower cost leaflet labels or booklet labels, particularly for short run multiple brand name versions of the same label.

SUMMARY OF THE INVENTION

The present invention provides a self-adhesive label carried on a backing of release material, the label comprising a multilaminar label, a self-adhesive overlaminate covering the multilaminar label and a self-adhesive overlabel adhered to an upper surface of the overlaminate.

The present invention further provides a method of producing a succession of self-adhesive labels carried on a backing of release material, the method comprising the steps of providing an elongate web including a backing of release material, applying a succession of multilaminar labels to the elongate web, laminating over the succession of multilaminar labels a self-adhesive plastics overlaminate web, applying a succession of self-adhesive overlabels over the overlaminate and die-cutting through the overlabels, the overlaminate and the multilaminar labels to form the self-adhesive labels in each of which at least one overlabel is adhered to a portion of the overlaminate web which covers a multilaminar label, The present invention yet further provides a self-adhesive label comprising a multilaminar label selected from the group consisting of a folded leaflet and a booklet, the multilaminar label having a top sheet and a rear sheet, a self-adhesive transparent plastics overlaminate adhered by a self-adhesive surface thereof over the top sheet of the multilaminar label and extending past an edge of the multilaminar label to form a first edge portion thereof, an opposed second edge portion of the overlaminate being located over an edge portion of the top sheet, and a self-adhesive overlabel which is adhered to at least one of the first and second edge portions, the overlabel having an upper surface which is capable of being overprinted by an overprinting device.

The present invention further provides a self-adhesive label carried on a backing of release material, the label comprising a base having a rearwardly-directed self-adhesive surface which is releasably adhered to a backing of release material, a printed multilaminar portion which is adhered to the base and a self-adhesive printed overlabel which is adhered by a second rearwardly-directed self-adhesive surface to an upper surface of at least one of the base and the multilaminar portion, the overlabel and the multilaminar portion each being printed with different information relating to a product to be labelled.

The present invention still further provides a pharmaceutical product comprising a container of a pharmaceutical composition carrying a self-adhesive label, the label comprising a base having a rearwardly-directed self-adhesive surface which is adhered to the container, a printed multilaminar portion which is adhered to the base and a self-adhesive printed overlabel which is adhered by a second rearwardly-directed self-adhesive surface to an upper surface of at least one of the base and the multilaminar portion, the overlabel being printed with information specific to the pharmaceutical composition in the container and the multilaminar portion being printed with information generic to the pharmaceutical product.

BRIEF DESCRIPTION OF THE DRAWINGS

Embodiments of the present invention will now be described, by way of example only, with reference to the accompanying figures, in which.

DETAILED DESCRIPTION OF TME PREFERRED EMBODIMENTS

In the figures, the thickness of some of the layers has been exaggerated for the purpose of clarity of illustration.

Figure 1:
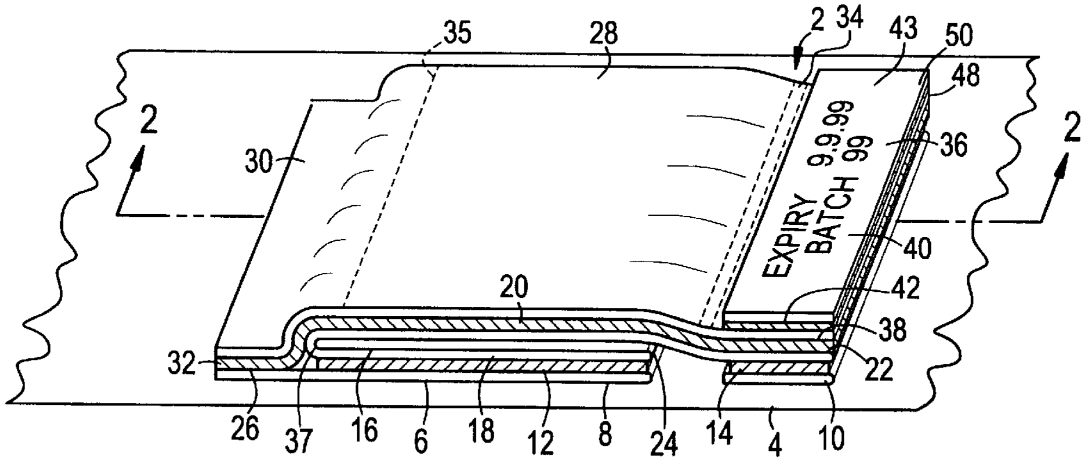
FIG. 1 is a perspective plan view of a self-adhesive label carried on a backing of release material in accordance with a first embodiment of the present invention.

Referring to FIG. 1, there is shown a self-adhesive label 2 in accordance with a first embodiment of the present invention when carried on a backing 4 of release material. Typically, a succession of such self-adhesive labels is carried on a elongate liner web of the backing 4 of the release material and the backing 4 of release material is wound into a reel in known manner for automatic application of the labels to a succession of products or containers to be labelled by a labelling machine.

The self-adhesive label 2 comprises a self-adhesive base 6, typically of paper or plastics, which is coated on its rear surface with a layer of pressure-sensitive adhesive which is releasably adhered to the backing 4 of release material. The base 6 comprises a major pen 8 and a minor portion 10 which are spaced in the longitudinal direction of the backing 4 of release material. Each of the major portion 8 and the minor portion 10 have had applied thereover respective layers 12,14 of adhesive, for example a water-soluble adhesive such as PVA adhesive, which adheres a folded leaflet 16 to the base 6. In alternative arrangements, a booklet may be employed instead of a folded leaflet. The folded leaflet 16 in this embodiment comprises a rear sheet 18 and an overlying top sheet 20 having an extending portion 22 which extends longitudinally past the free transverse edge 24 of the rear sheet 18. However, other forms of folded leaflets may be employed. The rearwardly facing surface of the rear sheet 18 is adhered to the major portion 8 of the base 6 by the layer of adhesive 12 and the extending portion 22 of the folded leaflet 16 is adhered to the minor portion 10 of the base 6 by the layer of adhesive 14. In this way, the folded leaflet 16 is retained in a folded and closed configuration on the backing 4 of release material. The folded leaflet 16 and a transverse edge portion 26 of the major portion 8 of the base 6 which is not covered by the folded leaflet 16 are overlaminated with a self-adhesive transparent plastics material 28 which comprises a layer 30 of plastics such as oriented polypropylene coated on its reverse side with a layer 32 of pressure-sensitive adhesive by which the overlaminate 28 is adhered to the upper surfaces of the transverse edge 26 and of the folded leaflet 16. A pair of perforation lines 34 extends through the overlaminate 28 and the top sheet 20 of the folded leaflet 16 whereby when the label 2 is adhered by the base 6 to a product to be labelled, for example a pharmaceutical container, the label 2 can be opened by tearing along the lines of perforations 34 thereby to access the interior of the folded leaflet 16. A further perforation line 35 is provided through the overlaminate 28, optionally generally aligned with a perforation line (not shown) in the folded leaflet 16 in the vicinity of the fold 37 between the top and rear sheets 20,18. After the label 2 has been opened, the main portion of the top sheet 20 and the overlaminate 28 adhered thereto may be torn off from the remainder of the label 2.

In accordance with the present invention, a self-adhesive overlabel 36 is adhered over that portion 38 of the overlaminate which overlies the extending portion 22 of the top sheet 20 of the folded leaflet 16. The overlabel 36 comprises a paper layer 40 carrying a pressure-sensitive adhesive 42 on its rearwardly-directed surface. However, the overlabel may be composed of any other suitable printable material. The overlabel may be pre-printed with a solid colour for laser etching, or with information that is required by all generic labels, i.e. non-specific information in addition to batch-specific information which is required to be overprinted as described herein. The overlabel 36 has an uppermost surface which is readily printable by laser printing, thermal transfer printing or wet printing, for example with printed information 43 which as a lot or batch code and an expiry date. This is in contrast to the difficulty in printing the overlaminate 28, as discussed hereinabove. It is to be noted that after the label 2 has been opened and the main portion of the top sheet 20 is removed, the batch code and expiry date information remains on the label 2, and thus on the labelled product.

Figure 2:
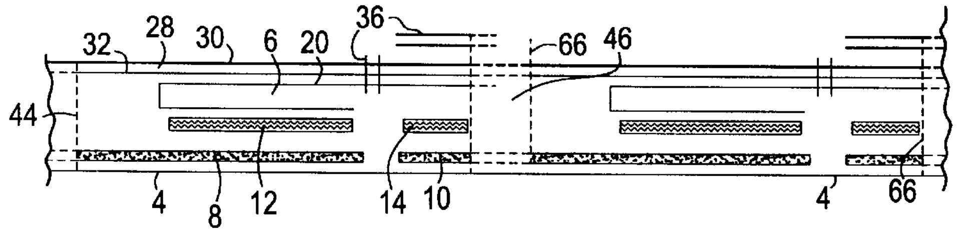
FIG. 2 is an exploded section of two of the labels of FIG. 1 during manufacture, the position of the applied overlabel and of the die-cut edges being shown and the section being taken generally along line A—A of FIG. 1.

The label 2 illustrated in FIG. 1 is manufactured as a succession of such labels 2 on a length of the backing 4 of release material. The structural arrangement of the various layers of the label 2 and the size and position of the original overlabel are illustrated in FIG. 2. It will be seen from FIG. 2 that each self-adhesive label 2 comprises the major and minor portions 8,10 of the base having respective adhesive layers 12,14 applied thereover with the folded leaflet 16 being adhered to the base 6 by the layers 12,14 of adhesive and with the entire label 2 being overlaminated by the overlaminate 28 comprising the plastics layer 30 and the pressure-sensitive adhesive layer 32. The lines 34 of perforations extend through the overlaminate 28 and the top sheet 20 of the folded leaflet 16. As shown in FIGS. 1 and 2, the self-adhesive labels 2 have been formed by die-cutting through the layers of the label down as far as, but not through, the backing 4 of release material. The die-cut edges are represented by vertical dashed lines in FIG. 2. The cut-off portions of the various layers which are formed during the die-cutting step and removed as a waste web matrix are illustrated in phantom in FIG. 2 between the vertical lines representing the die-cuts made during the die-cutting step.

As may be seen from FIG. 2, the major portion 8 of the base 6 of one label 2 is originally integral with the minor portion 10 of the base 6 of an adjacent label 2. The top sheet 20 of the folded leaflet 16 extends past the adhesive layer 14 and the overlaminate 28 is applied as a continuous web. The overlabels 36 are applied to the overlaminate web 28 as a succession thereof. Each overlabel 36 initially extends into a gutter 46 which is cut between adjacent labels 2 during the die-cutting step between the vertical lines 44 of FIG. 2. During the die-cutting step, portions of the overlabel 36, the overlaminate 28, the top sheet 20 of the folded leaflet 16 and the base 6 are cut away and then removed as a single matrix web. In an alternative arrangement, the adhesive layer 14 may also extend into the gutter 46. The waste skeleton of the web of the overlaminate 28 acts as a vehicle to which are adhered the remaining parts of the waste matrix.

In the embodiment of FIGS. 1 and 2, the overlabel 36 is adhered over that transverse edge 48 of the label 2 which during application of the labels constitutes the trailing flap 50 of the leaflet label 2. In the second embodiment illustrated in FIGS. 3 and 4, the label of the first embodiment is modified by providing on the one hand an additional overlabel 54 at the opposing transverse edge 52 of the label whereby the second overlabel 54 is provided at the leading flap 56 of the label 58 during application of the succession of the labels, 58 to products to be labelled by a label applicator. In FIGS. 1 to 4, like parts are indicated by like reference numerals. The label of the second embodiment is also modified by providing that the lines of perforation 60 extend through the overlabel 36. As may be seen from FIG. 4, the provision of two overlabels 36,54 at opposing transverse edges 48,52 of the label 58 provided that the labels 58 can be manufactured by applying a single composite overlabel 62 over the overlaminate 28 whereby following die-cutting a central portion 64 of the composite overlabel 62 is cut away and removed forming the two overlabels 36,54 on adjacent self-adhesive labels 58.

The lines of perforations 60 are separated by a sufficient distance so that an expiry date 66 is printed in the area between the lines of perforation 60. This can provide that when the label 58 is opened, the initial expiry date information is removed. For example, when the label 58 is employed to label pharmaceutical products, for example antibiotics in powder form, the label 58 and in particular the folded leaflet 16 includes information to enable the antibiotic powder to be reconstituted by the pharmacist. The expiry date information printed between the lines of perforation 60 relates to the expiry date for the powder and that information is removed when the pharmacist opens the label. After the pharmacist has reconstituted the antibiotic powder so as to be in liquid form, the pharmacist nay print a second earlier expiry date relevant to the reconstituted mixture on either of the two overlabels 36,54, or may add his own label onto or remote from the label on the bottle.

Figure 3:
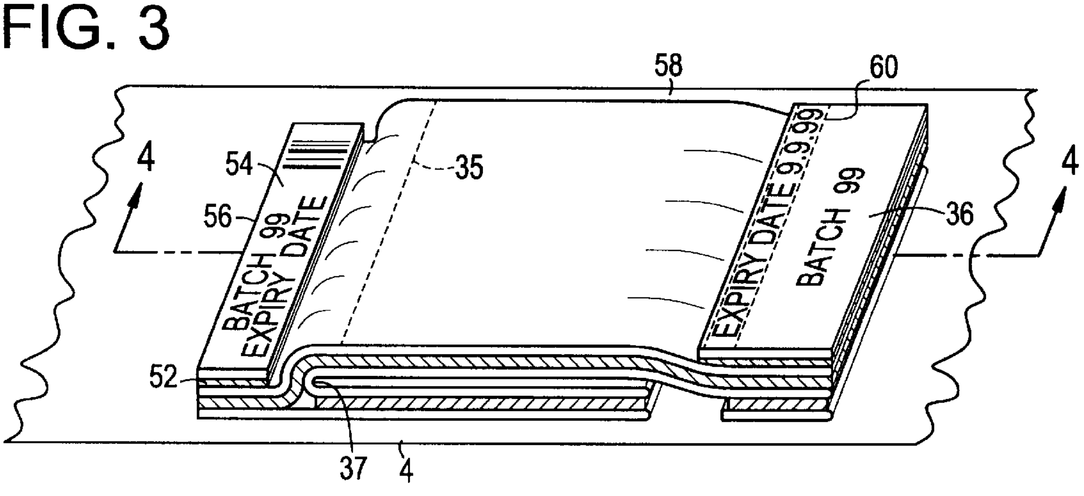
FIG. 3 is a perspective plan view of a self-adhesive label carried on a backing of release material in accordance with a second embodiment of the present invention.
Figure 4:
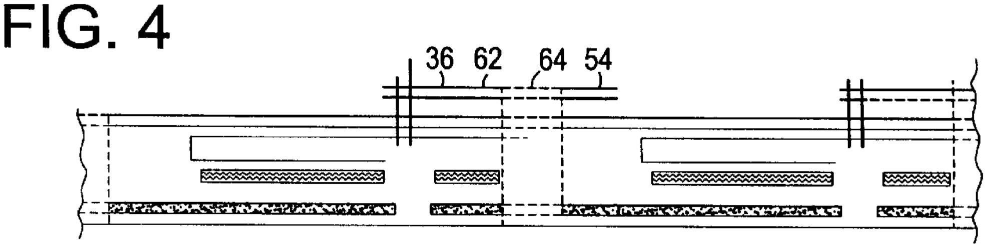
FIG. 4 is an exploded section of two of the labels of FIG. 2 during manufacture, the position of the applied overlabel and of the die-cut edges being shown and the section being taken generally along line B—B of FIG. 2.
Figure 5:
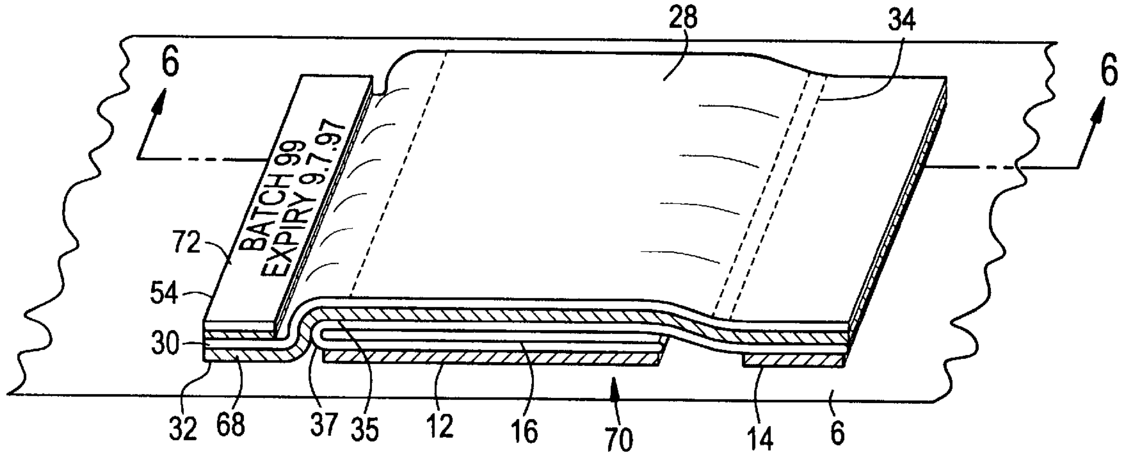
FIG. 5 is a perspective plan view of a self-adhesive label carried on a backing of release material in accordance with a third embodiment of the present invention.
Figure 6:
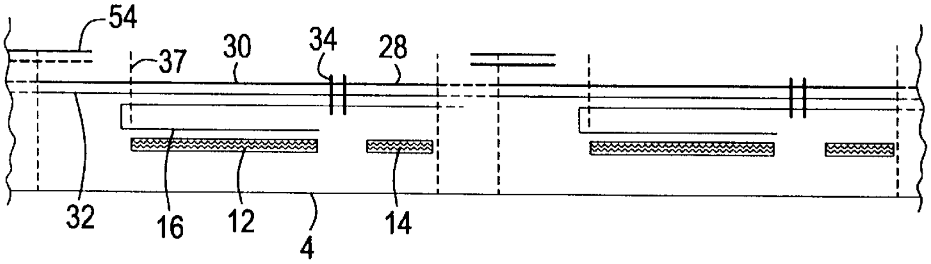
FIG. 6 is an exploded section of two of the labels of FIG. 5 during manufacture, the position of the applied overlabel and of the die-cut edges being shown and the section being taken generally along line C—C of FIG. 5.

A third embodiment of the present invention is illustrated in FIGS. 5 and 6. This embodiment is a further modification of the embodiment of FIGS. 1 and 2 in which the overlabel 36 has been omitted but an overlabel 54, corresponding to the overlabel 54 of the second embodiment illustrated in FIGS. 3 and 41 is provided at the leading flap 56 of the label 70. In addition, this embodiment is modified with respect to the first and second embodiments by the omission of the base 6. As is shown in FIGS. 5 and 6, the adhesive layer 12,14 are applied directly to the backing 4 of release material and the transverse edge 68 of the overlaminate 28 is adhered directly to the backing 4 of release material by the layer 32 of pressure-sensitive adhesive located on the rearwardly-directed surface of the plastics layer 30. In this embodiment, the provision of the overlabel 54 enhances the stiffness of the leading flap 72 of the label which, in the absence of the overlabel 54, would simply consist of the relatively flexible overlaminate 28.

During manufacture of the self-adhesive labels 70, the overlabel 54 is cut out from an applied overlabel which extends into the gutter 46 which is die-cut between adjacent labels 70 as shown in FIG. 6.

Figure 7:
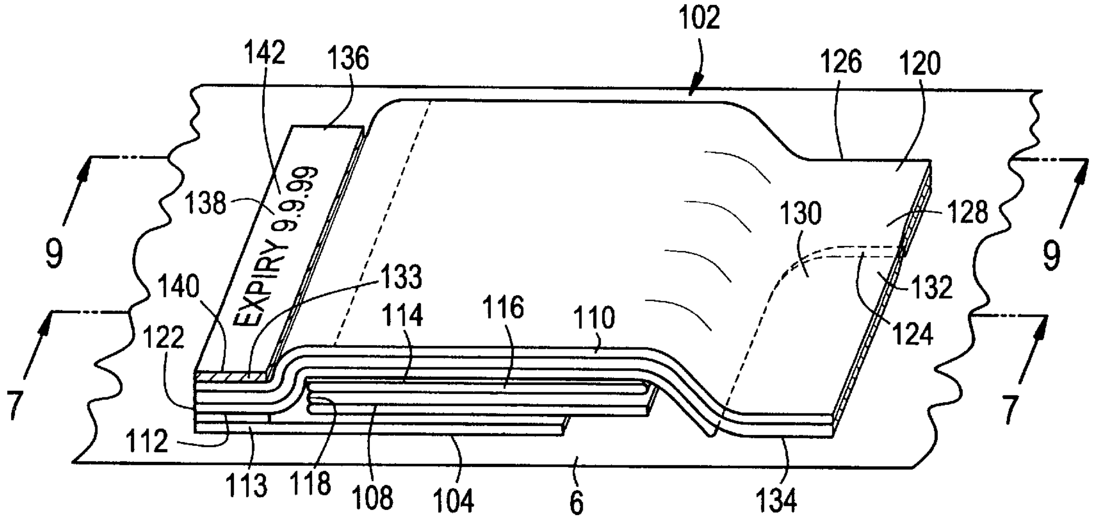
FIG. 7 is a perspective plan view of a self-adhesive label carried on a backing of release material in accordance with a fourth embodiment of the present invention.
Figure 8:
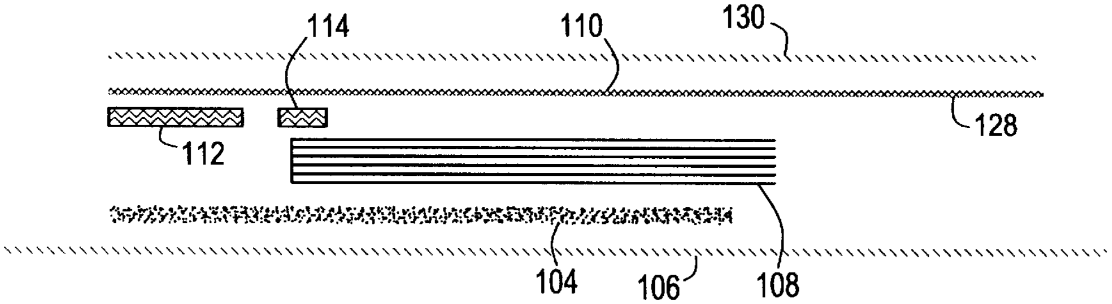
FIG. 8 is an exploded section along line D—D of the label of FIG. 7.
Figure 9:
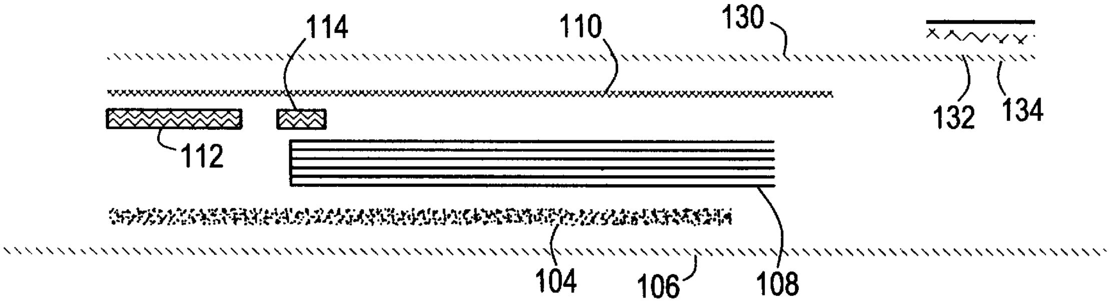
FIG. 9 is an exploded section along line E—E of the label of FIG. 7.

A fourth embodiment of the present invention is illustrated in FIGS. 7 to 9.

In this embodiment, the label of the first embodiment is modified by providing a booklet instead of a folded leaflet as in addition a printed cover sheet of plastics or paper is provided between the booklet and self-adhesive overlaminate. The minor portion of the base and its overlying adhesive layer are omitted. The free transverse edge of the cover sheet is die-cut so as to provide a peel-up tab and adjacent thereto a rearwardly-exposed self-adhesive surface of the overlaminate which is adhered directly to the backing of release material thereby releasable to hold the label in a closed configuration. The resultant label is resealable and the perforation lines are omitted.

More particularly, the self-adhesive label 102 comprises a self-adhesive base 104 carried on a backing 106 of release material. A booklet 108 is disposed over the base 104 and a cover sheet 110 is adhered by a first layer of adhesive 112 to a transverse edge 113 of the base 104 and by a second layer 114 of adhesive to an upper surface 116 of the booklet 108 along the spine 118 of the booklet 108. The cover sheet 110 is provided at its free transverse edge 120 opposite to the other transverse edge 122 which is adhered to the base 104 with a die-cut edge 124. The die-cut edge 124 defines at one longitudinal edge 126 of the label 102 a peel-up tab 128. A transparent self-adhesive plastics overlaminate 130 is adhered by its self-adhesive surface over the cover sheet 110. The overlaminate 130 extends past the die-cut edge 124 of the cover sheet 110 at a location transversely adjacent to the peel-up tab 128 to form an edge portion 132 thereof which has a rearwardly-exposed self-adhesive surface 134 which is adhered directly to the backing 106 of release material. When the label 102 is adhered to a product, e.g. a pharmaceutical container, a user may manually pull the peel-up tab 128 thereby pulling the edge portion 132 of the overlaminate 130 away from the product so as to open the label 102. After the booklet 108 has been read by the user, the label 102 may be returned into its closed configuration by re-adhering the edge portion 132 of the overlaminate 130 back onto the product surface.

In accordance with the present invention, an overlabel 136 comprising a paper layer 138 having an underlying self-adhesive layer 140 of pressure-sensitive adhesive is adhered by the layer 140 of pressure-sensitive adhesive to an opposite edge portion 133 of the laminar material 130. The overlabel 136 is printed with information 142, such as an expiry date.

Figure 10:
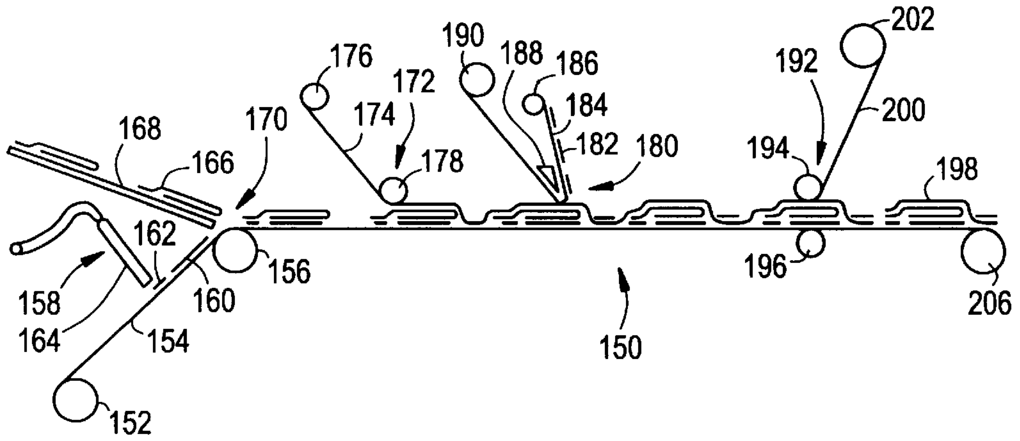
FIG. 10 is a diagrammatic elevation of an apparatus for producing labels in accordance with the present invention and being shown implementing a method of producing the self-adhesive label illustration in FIG. 5.

FIG. 10 illustrates an apparatus, designated generally by the reference numeral 150, for the manufacture of self-adhesive labels in accordance with the present invention and in particular self-adhesive labels of the third embodiment of the present invention. The labels of the third embodiment of the present invention do not require a self-adhesive base. However, it will of course be appreciated by those skilled in the art that the method and apparatus illustrated and described with respect to FIG. 10 readily be modified to manufacture labels in accordance with the invention incorporating such a base, such as the labels of the first, second and fourth embodiments. In addition, other modifications to the method of the invention will be readily apparent from the following description of the apparatus illustrated and its operation to enable other modifications of the labels of the invention to be made.

Referring to FIG. 10, a reel 152 comprising a backing 154 of release material is unwound and fed by a web drive mechanism represented by a roller 156 to an adhesive applying station 158 at which layers of adhesive 160,162 (corresponding to the layers 12,14 of adhesive illustrated in FIG. 5) are applied to the upper surface of the backing 154 of release material by an adhesive applicator 164. A succession of folded printed leaflets 166 is applied to a succession of the pairs of adhesive layers 160,162 by a multilaminar label applying system represented diagrammatically by the plate 168 in FIG. 10. In the illustrated embodiment, each folded leaflet 166 corresponds to the folded leaflet 16 illustrated in FIG. 5 and the rear sheet 18 and the extending part 22 of the top sheet 20 are respectively adhered to the adhesive layers 160,162 at a multilaminar label applying station 170. Thereafter, the liner web of the backing 154 of release material is conveyed to an overlaminating station 172 at which a web 174 of self-adhesive transparent plastics overlaminate is fed out from a reel 176 thereof and applied by a roller 178 over the assembly of the succession of folded leaflets 166 on the backing 154 of release material. The overlaminated assembly then passes to an overlabel applying station 180 at which a reel of self-adhesive overlabels 182 carried on a second backing 184 of release material is fed out from a reel 186 thereof. The backing 184 of release material is pulled back past a peel plate 188, representing a self-adhesive label applicator known in the art, so that the overlabels 182 are peeled off the backing 184 and successively applied to the correct portions of the overlaminate 174 between adjacent pairs of folded leaflets 166. The backing 184 is rewound onto a take-up reel 190. The combined assembly then passes to a die-cutting station 192. There is provided an upper die-cutting roller 194 and a lower opposed backing roller 196. The die-cutting roller 194 is, provided with a raised cutting surface which cuts out the required labels 198 from the various material layers. The waste web matrix 200 is removed from the backing 154 of release material and wound up into a waste reel 202. The succession of self-adhesive labels 198 is wound onto a take-up reel 204.

It will be apparent to those skilled in the art that while the method and apparatus illustrated in FIG. 10 are for use in producing the labels of FIG. 5, the method and apparatus may readily be modified to produce labels having the structure illustrated in FIGS. 1 and 3 in which the folded leaflet is adhered to a self-adhesive base. For these embodiments, the initial elongate web including the backing of release material which is unwound from a reel thereof includes a succession of self-adhesive bases carried thereon. In the embodiment illustrated in FIG. 7 in which an adhesive layer is provided over the top surface of the booklet, the adhesive applying step may apply adhesive to the undersurface of a cover sheet.

In the die-cutting step, any required lines of perforation through the overlabel and/or the overlaminate and/or the folded leaflet or booklet are simultaneously formed by the die-cutting roller. Alternatively, the perforation lines may be formed in a subsequent die-cutting step at another die-cutting station.

Figure 11:
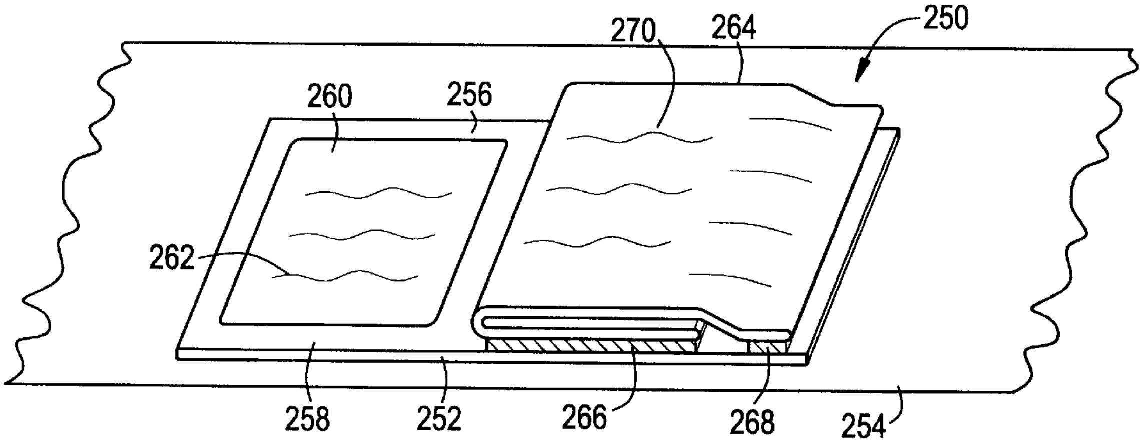
FIG. 11 is a perspective plan view of a self-adhesive label carried on a backing of release material in accordance with a fifth embodiment of the present invention.

A self-adhesive label in accordance with a fifth embodiment of the present invention is illustrated in FIG. 11. In this embodiment, the self-adhesive label 250 includes a self-adhesive base portion 252 which is adhered by its rearwardly-directed self-adhesive surface to a backing 254 of release material. A self-adhesive overlabel 256 is adhered by its rearwardly-directed self-adhesive surface to the upper surface 258 of the base portion 252. The overlabel 256 has an upper surface 260 printed with printed information 262. The self-adhesive label 250 also includes a folded leaflet portion 264 which is carried on the base portion 252 and in the illustrated embodiment is adhered in a folded and closed configuration by two spaced layers 266,268 of adhesive on the upper surface 255 of the base portion 252. The folded leaflet 264 is printed with printed information 270.

In accordance with this aspect of the present invention the self-adhesive label 250 has a structure which is intended to be suitable for labelling a number of different slightly varying versions of the same product. The printed information 270 on the relatively expensive folded leaflet 264 is common or generic information which is required by each version of the label and the printed information 262 on the relatively inexpensive overlabel 256 is version-specific or product-specific information. For example, when the label is intended to label a range of pharmaceutical products, the folded leaflet is printed with the name of a product, the manufacturer of the product, instructions to a pharmacist on how to reconstitute the pharmaceutical composition, details on how to take the pharmaceutical composition, details on any contra-indications etc. and the overlabel is printed with information such as the number of tablets in the particular container, the batch number and expiry date of the pharmaceutical composition, the particular dosage of the pharmaceutical composition, etc. Thus for a number of versions of the label, only a single relatively expensive leaflet is required which increases the efficiency of production of the label and any differences between the various versions of the labels can be accommodated by using different relatively inexpensive overlabels.

As will be apparent to the skilled person, the self-adhesive label illustrated in FIG. 11 may be modified in a number of respects without varying from the essential aspect of the invention. For example, a booklet may be employed instead of a folded leaflet, the folded leaflet or booklet may be provided with tear lines and may be at least partially removable from the base and the entire label may be overlaminated with a self-adhesive plastics laminate.

Figure 12:
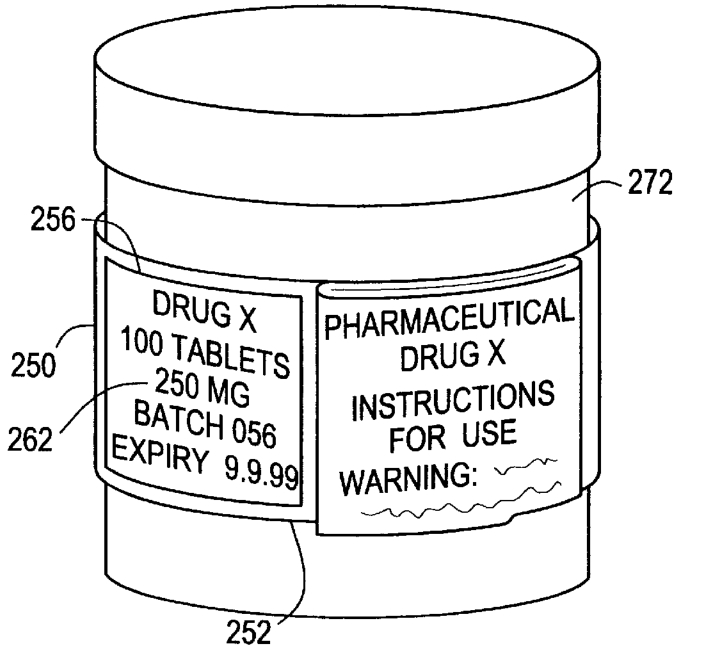
FIG. 12 illustrates a pharmaceutical product labelled with the label of FIG. 11.

FIG. 12 shows the label of FIG. 11 when labelled on a pharmaceutical product 274 such as a pharmaceutical composition. The overlabel 256 is printed with information 262 relating to the specific product in the container, for example the batch number and the expiry date and the particular dose rate of the pharmaceutical product and the folded leaflet 264 is printed with information 270 relating to the product generally, such as the trade name, instructions for use, warning hazards and contra-indications etc.

In accordance with the preferred embodiments of the present invention, the labels can provide a surface for overprinting which can be the same as that currently employed on conventional pharmaceutical labels for the printing of specific information such as batch or lot code, expiry date etc. despite the labels of the invention being leaflet or booklet labels which have been overlaminated by a self-adhesive plastics layer. The surface of the overlabel can be optimised for the overprinting process since that surface has no function to perform other than to act as a surface for accepting the overprint. The overlabel is provided with a suitably selected adhesive which ensures a sufficiently strong bond to the laminate in order for the overprint area to be permanently attached to the underlying overlaminate.

The leaflet or booklet labels of the preferred embodiments of the present invention also provide the advantage that when the label is not provided with an underlying self-adhesive base, the addition of the overlabel to the leading laminate edge can serve to stiffen that edge sufficiently so as to ensure that automatic application of a succession of the labels to products by the use of an automatic labelling machine can be at least as reliably achieved as for conventional self-adhesive labels for similar products. The use of a pressure-sensitive overlabel as an additional layer over the leading laminate flap can allow the use of a thinner laminate than currently employed for such leaflet or booklet labels incorporating such a laminate flap. This enables cost savings to be achieved by the use of a thinner overlaminate which can off-set the additional cost of the overlabel. For example, in the embodiment of FIG. 5 since the overdaminate layer is covered at the leading edge of the label by the overlabel, this permits the use of an overlaminate having a thickness of 0.001 inches (0.0254 mm) as opposed to a thickness of 0.002 inches (0.0508 mm) because of the consequentially reduced thickness and stiffness requirement for the overlaminate at the leading edge of the label.

What is claimed is:

1. A method of producing a succession of self-adhesive labels carried on a backing of release material, the method comprising the steps of providing an elongate web including a backing of release material, applying a succession of multilaminar labels to the elongate web, laminating over the succession of multilaminar labels a self-adhesive plastics overlaminate web, applying a succession of self-adhesive overlabels over the overlaminate and die-cutting through the overlabels, the overlaminate and the multilaminar labels to form the self-adhesive labels in each of which at least one overlabel is adhered to a portion of the overlaminate web which covers a multilaminar label.

2. A method according to claim 1 further comprising the step of applying a succession of layers of adhesive to the backing of release material of the elongate web and wherein the multilaminar labels are applied to the adhesive layers.

3. A method according to claim 1 wherein the elongate web further includes a succession of self-adhesive bases carried on the backing of release material and the method further comprises the step of applying a succession of layers of adhesive to the self-adhesive bases prior to the multilaminar label applying step and in the die-cutting step the bases are cut through as far as the backing of release material.

4. A method according to claim 1 wherein the overlabels are applied by a self-adhesive label applicator.

5. A method according to claim 1 further comprising the steps of forming at least one perforation line through at least the overlaminate.

6. A method according to claim 1 wherein each applied overlabel comprises a composite overlabel which in the die-cutting step is cut to form two overlabels, each being adhered to a respective overlaminate portion of a respective self-adhesive label.

7. A method according to claim 1 wherein said overlabel is permanently adhered to an upper surface of said overlaminate.

* * * * *